Figure 1:
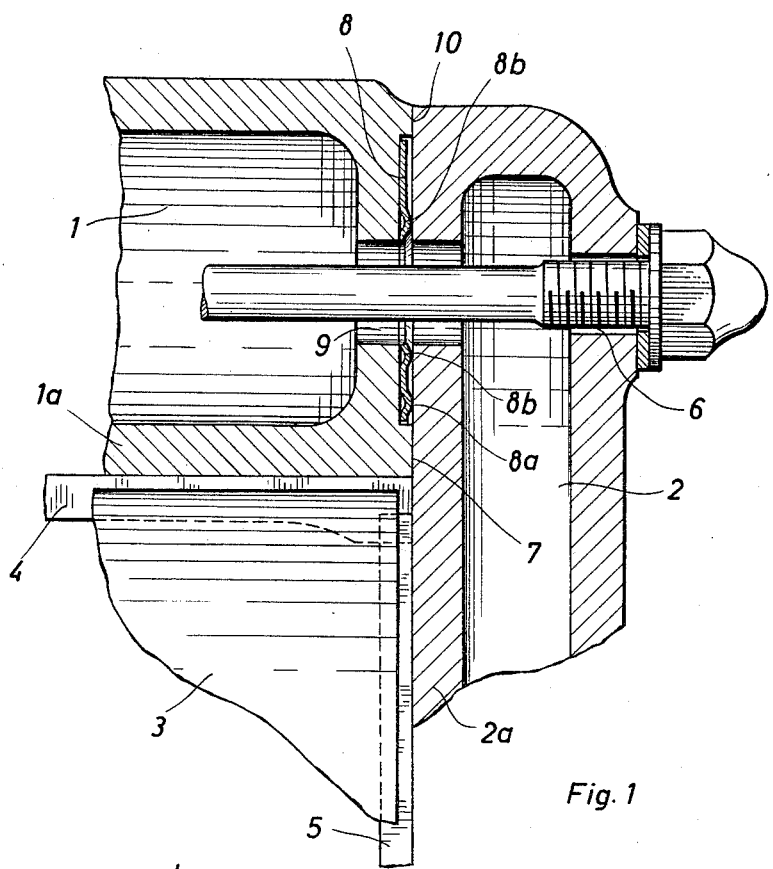

Aug. 30, 1966 H. BAUMLER ETAL 3,269,373
SEALING ARRANGEMENT FOR A ROTARY PISTON TYPE ENGINE
Filed July 6, 1964

Inventors

Hermann BÄUMLER &
Fritz BONDROIT

By Toulmin & Toulmin
Attys

United States Patent Office 3,269,373
Patented August 30, 1966

3,269,373
SEALING ARRANGEMENT FOR A ROTARY
PISTON TYPE ENGINE
Hermann Baumler and Fritz Bondroit, Burscheid, Germany, assignors to Goetzewerke Friedrich Goetze
A.-G., Burscheid, Bezirk Dusseldorf, Germany
Filed July 6, 1964, Ser. No. 380,527
6 Claims. (Cl. 123—8)

This invention relates to an engine of the rotary- or wing piston type, hereinafter briefly referred to as rotary-piston engine, which comprises an engine block forming a cylinder, and a cylinder head forming a closure therefor, and is particularly concerned with a sealing arrangement for such engine. This application is a continuation-in-part of my co-pending application, Serial No. 123, 143, filed July 11, 1961, now abandoned.

Known rotary-piston engines present particular difficulties in connection with the sealing of the combustion chamber at the area of transition extending between the end of the engine block and the walls of the cylinder head. There must not be produced a noticeable gap at such area, so that the sealing elements of the rotating piston are at all points in sufficient sealing engagement with the cylinder walls, while there must be provided an elastic insert between the end of the engine block and the adjacent cylinder head, so as to equalize or to compensate unavoidable irregularities of the metallic surfaces.

Attempts were heretofore made to solve the resulting problem by the provision of socalled annular cord rings made of elastic material and being disposed in relatively narrow grooves formed in the end wall of the engine block. Such rings fail at higher temperatures and become in time pervious owing to lessening elasticity thereof.

It has also been suggested to provide known flat sealing gaskets or elements, such for example, as they are used in connection with cylinder heads of internal combustion engines. However, such gaskets result in a gap between the end of the engine block and the cylinder head, through which the hot combustion gases can attack and prematurely destroy the sealing material. Moreover, the use of such gasket seals presents the danger of faulty sealing at the flanks of the piston, since they can not be accurately dimensioned in axial direction.

The present invention proceeds from the thought that a satisfactory sealing can be provided by particular configuration of one of the end wall of the engine block and the surface of the cylinder head cooperating with such end wall.

According to the invention, it is proposed to recess one of the end wall of the engine block and the adjacent surface part of the cylinder head, leaving only a relatively narrow head adjacent to the combustion chamber, thereby providing room for the disposal of a generally flat and preferably ridged elastic sealing element.

This makes it possible, first, to accurately fix the axial extent of the cylinder and, second, to provide an extraordinarily reliable seal between the respective surfaces without having to expect premature destruction of the seal by the action of the hot combustion gases.

The arrangement according to the invention also permits the use of ridged metallic sealing elements which provide for reliable sealing action even in the presence of highest working temperatures.

A narrow peripherally extending bead may also be provided at one of the end of the engine block and the cylinder head, so as to form an axially relatively shallow, radially directed sealing chamber in which is disposed the generally flat sealing element. This results in the further advantage that a sealing element may be used which is made of compressible material or with an axial dimension less than the depth of the sealing chamber, and which may be inserted between the two beads with press fit so that it is held therebetween in tensioned or prestressed condition.

It is moreover advantageous to provide either the recessed surface or the surface of the flat sealing element with protuberances or ridges, spaced if desired, which protrude from the radially extending plane thereof, so as to adapt the seal accurately with respect to the elastic behavior of the engine block or the cylinder head, respectively. These ridges may be of conical configuration.

The sealing element may, by the use of such protuberances, be made larger at the inner edge, that is at the edge which faces the combustion chamber, than along the outer peripheral edge thereof.

The specific surface pressure in the region toward the combustion chamber is thereby increased, thus also improving the sealing effect. This feature is also operative to reliably prevent undesired stressing of the cylinder head incident to the tightening of the screw means used for the fastening thereof.

According to another feature of the invention, the sealing element may also be provided with a thickened peripheral rim, or with thickened portions extending peripherally thereof, and corresponding in depth to the depth of the recess forming the sealing chamber in the respective parts. Such thickening, extending radially outwardly of the screw fastening means, will hold the cylinder head at its outer rim at a level corresponding to the height of the inner bead on one of the end of the engine block and on the cylinder head, which faces the combustion chamber.

Figure 2:
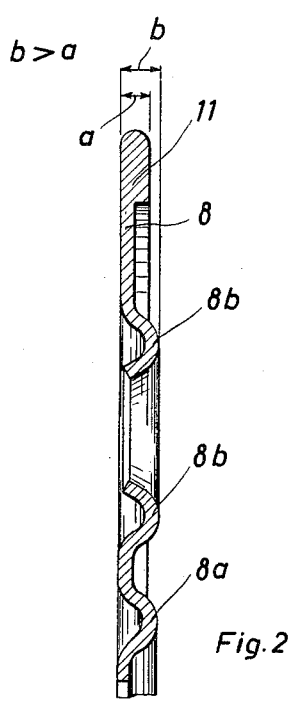

The foregoing and further features and details of the invention will now be described with reference to the accompanying drawing, wherein:

FIGURE 1 shows a part sectional view through portions of an engine extending along the sealing region; and FIGURE 2 shows a sealing element having a thickened marginal portion.

Numeral 1 indicates a portion of the engine block having an inner wall 1a which forms the cylinder, such block being provided with a cylinder head forming an inner wall 2a and being fastened in place by screw means 6. Numeral 3 indicates a portion of the piston, which rotates within the cylinder formed by the inner wall 1a of the block 1 and terminated by the inner wall 2a of the cylinder head, such piston being sealed with respect to the cylinder walls by means of sealing elements 4 and 5.

Formation of a gap at the juncture of the cylinder wall 1a and the wall 2a of the cylinder head must be avoided. According to the invention, the end of the cylinder wall 1a is for this purpose provided with an axially extending inner rim or bead 7 which is in direct engagement with the inside of the wall 2a of the cylinder head. A recess extends radially outwardly from this rim 7, forming an inner surface upon which is disposed the generally flat or planar sealing element or member 8. In the illustrated example, this sealing member is provided with sealing ridges.

The cylinder is thereby sealed to the outside by a continuous ridge 8a which extends about the inner rim 7 at the end of the cylinder wall 1a. The sealing element 8 can be advantageously used for similarly sealing off other passages or channels that may be provided in the engine block 1 or in the cylinder head 2, for example, as shown in the drawing, the sealing member 8 is provided with a further ridge 8b which serves for sealing off the water circulation channel 9.

Rib 8b may, for example, encircle passage 9. Thus, there may be several of the ribs 8b distributed around the seal members. The ridges 8a and 8b are formed to such a height as to be sealingly compressed between the head and block. This will be seen in FIGURE 2.

The engine block 1 is also provided with an outer peripheral rim 10 extending radially outwardly of the fastening screw means such as 6, such rim 10 being complemental to the inner rim 7 and securing the mounting of the cylinder head without imparting stresses thereto incident to the tightening of the fastening screws.

The outer peripheral rim 10 at the end of the engine block may be omitted and the sealing element 8 may instead be provided with a marginal thickening 11, as shown in FIGURE 2, which assumes the function of the omitted rim.

We claim:
1. The combination in a rotary piston combustion engine of a cylinder block having a cylinder bore, a piston rotatably mounted in the cylinder bore, a cylinder head mounted on the block at the end of said piston to close the end of said bore, said cylinder block and cylinder head being fixedly interconnected, and substantially heat insensitive sealing means between the cylinder head and the cylinder block, said sealing means comprising a thin flexible ring-like metal member having larger lateral dimensions than said cylinder bore and being generally rectangular in cross-section, said ring having the one smaller cross-sectional dimension in one direction which represents the thickness of the metal from which it is formed and which is only a small fraction of the other and larger cross-sectional dimension, ring-like recess means formed in at least one of said block and cylinder head in surrounding relation to said bore for receiving said member and generally rectangular in cross-section, said recess means having one cross-sectional dimension at least as large as the larger cross-sectional dimension of said member and having its other cross-sectional dimension larger than the smaller cross-sectional dimension of said member, endless rib means formed in said member and including a rib extending around said member adjacent the edge thereof nearest said bore, the dimension of said metal member in said one direction at said rib means when said member is not confined in said recess means being greater than the smaller cross-sectional dimension of said recess means, said cylinder head when mounted on said cylinder block and fixedly connected thereto being in direct interengagement with said block in a region extending completely around said bore and at least in an area between the inner periphery of said recess and said bore whereby said recess is closed on the side toward said bore while said metal member is confined in said recess with said rib means compressed but not crushed.

2. The combination according to claim 1, in which said block and head are provided with passage means for cooling fluid, bores in said block and head connected to said passage means and in registration with each other, the axis of said bores extending through said recess means, said metal member having an aperture registering with said bores so as to permit said bores to communicate, and said rib means including a rib formed in said member around the aperture therein for sealing engagement with the walls of said recess means thereby to seal the inside of said recess means from the cooling fluid in said bores in said block and head.

3. The combination according to claim 2, in which said cylinder head and cylinder block are in direct interengagement in the region surrounding said metal member on the side thereof opposite said cylinder bore.

4. The combination according to claim 2, in which said metal member has a thickened region thereof on the side opposite the side toward said cylinder bore, said thickened region being of substantially the same thickness as the smaller cross-sectional dimension of said recess means and said thickened region being fixedly clamped between said head and said block.

5. The combination of a block having a bore, a head mounted on the block to close the end of said bore, and substantially heat-insensitive sealing means between the head and the block, said sealing means comprising a thin flexible ring-like metal member having larger lateral dimensions than said bore and being generally rectangular in cross-section, said ring having the one smaller cross-sectional dimension in one direction which represents the thickness of the metal from which it is formed and which is only a small fraction of the other and larger cross-sectional dimension, recess means formed in at least one of said block and head in surrounding relation to said bore for receiving said member and generally rectangular in cross-section, said recess means having one cross-sectional dimension at least as large as the larger cross-sectional dimension of said member and having its other cross-sectional dimension larger than the smaller cross-sectional dimension of said member in said one direction, rib means formed in said member and including at least one endless rib extending around said member adjacent the edge thereof nearest said bore, the dimension of said metal member in said one direction at said rib means when said member is not confined in said recess means being greater than the smaller cross-sectional dimension of said recess means, said cylinder head when mounted on said cylinder block and fixedly connected thereto being in direct interengagement with said block in a region extending completely around said bore and at least in an area between the inner periphery of said recess and said bore whereby said recess is closed on the side toward said bore while said metal member is confined in said recess with said rib means compressed but not crushed.

6. The combination according to claim 5, in which said block and head are provided with passage means for cooling fluid, bores in said block and head connected to said passages and in registration with each other, the axis of said bores extending through said recess means, said member having an aperture registering with said bores so as to permit said bores to communicate, and said rib means including a rib formed in said member around the aperture therein for sealing engagement with the walls of said recess means thereby to seal the inside of said recess means from the cooling fluid in said bores in said block and head.

References Cited by the Examiner

UNITED STATES PATENTS

| | | | |
|---|---|---|---|
| 1,770,225 | 7/1930 | Blackman | 123—14 |
| 2,489,326 | 11/1949 | Rockstrom et al. | |
| 2,979,042 | 4/1961 | Bentele | 123—8 |
| 3,056,391 | 10/1962 | Hoadley. | |
| 3,070,074 | 12/1962 | Mallinckrodt. | |

FOREIGN PATENTS

| | | |
|---|---|---|
| 1,018,949 | 10/1952 | France. |
| 940,153 | 3/1956 | Germany. |

MARK NEWMAN, *Primary Examiner.*

SAMUEL LEVINE, *Examiner.*

F. T. SADLER, *Assistant Examiner.*